June 22, 1926.
H. KLONICK
NONSKID CHAIN
Filed March 21, 1923
1,589,602
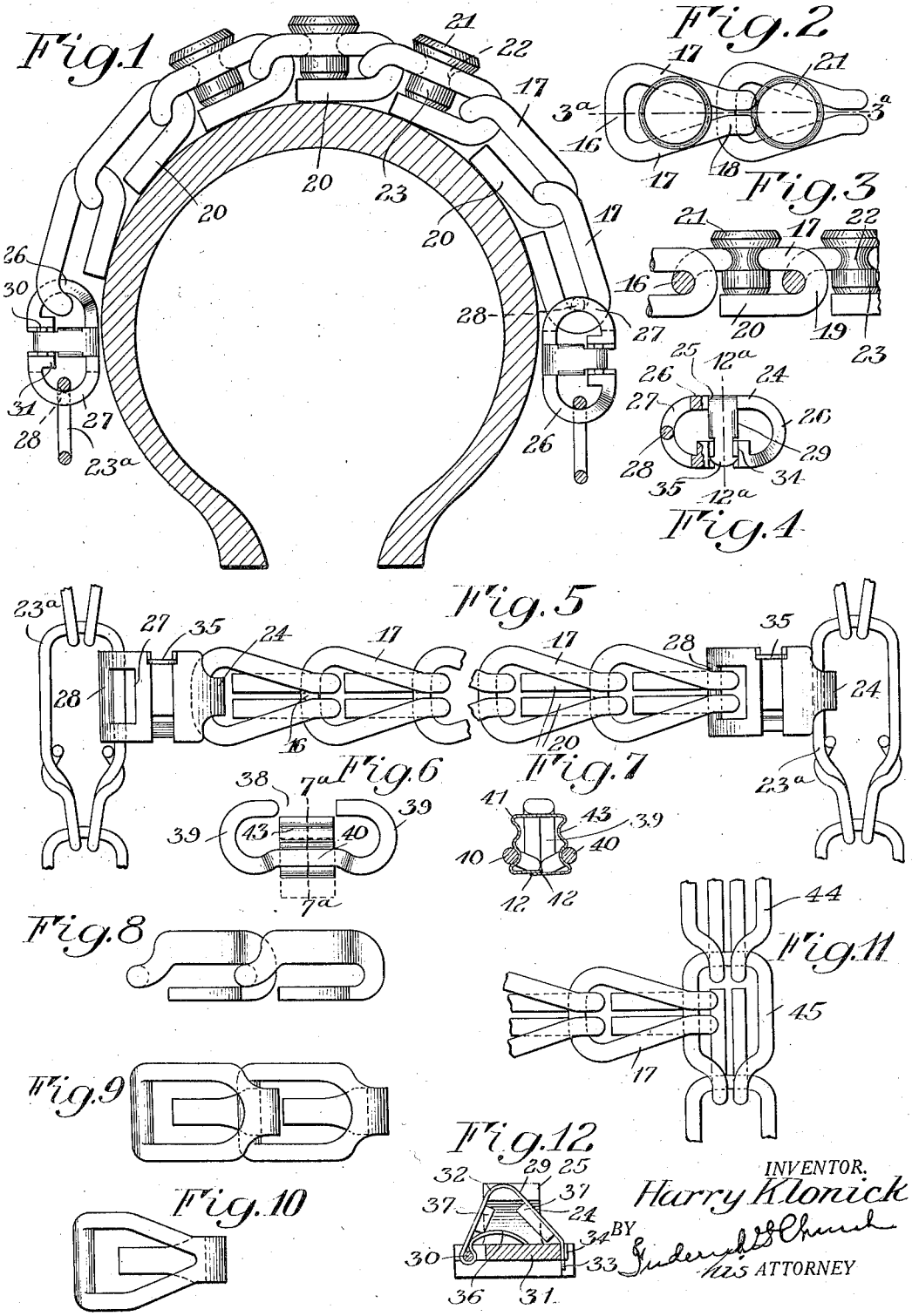

Patented June 22, 1926.

1,589,602

UNITED STATES PATENT OFFICE.

HARRY KLONICK, OF ROCHESTER, NEW YORK.

NONSKID CHAIN.

Application filed March 21, 1923. Serial No. 626,536.

This invention relates to non-skid chains for vehicle wheels, and more particularly to the variety comprising side and cross chains in which the cross chains are composed of detachable links or parts therefor replaceable when worn out or broken, the present invention being in the nature of an improvement upon that disclosed in my application Serial No. 592,432, filed October 4, 1922, Patent No. 1,480,269, Jan. 8, 1924 for non-skid chains. One object of the present invention is to provide a cross chain having links of a simple, practical and rugged form so constructed that they can be readily detached individually for replacement without the use of tools but remain securely locked together against accidental detachment in all positions of the chain. Another object is the provision of a cross chain having one or more of its links provided with a simple and efficient wear body or stud detachably held in place on the link so as to take the major portion of the wear and be replaceable when worn out.
Still a further object is the provision of a cross chain having individually detachable links interlockingly engaged with one another against inadvertent detachment in all positions of the chain and carrying detachable wear bodies detachably secured on the links by the same interlocking engagement which secures the latter together. Still a further object is to provide a cross chain having an efficient end link for detachably connecting its ends with the side or circumferential chains. To these and other ends the invention consists in certain improvements and combinations of parts, all as will be hereinafter more fully described, the novel features being pointed out in the claims at the end of the specification.

In the drawings:

Figure 1 is a transverse sectional view through the rubber tire portion of a vehicle wheel showing a non-skid chain embodying the present invention applied thereto;

Figure 2 is a plan view of links of the cross chain shown in Figure 1;

Figure 3 is a sectional view on the line 3ª—3ª in Figure 2;

Figure 4 is a side view partly in section of an end link for connecting the cross and side chains;

Figure 5 is a plan view of the chain portion shown in Figure 1 but with the wear bodies or studs omitted;

Figure 6 is a side view of a modified form of end link for connecting the cross and side chains;

Figure 7 is a sectional view on the line 7ª—7ª of Figure 6;

Figure 8 is a side view of a modified form of link construction for the cross chains;

Figure 9 is a plan view of the parts shown in Figure 8;

Figure 10 is a further modification of the cross chain link;

Figure 11 shows the form of cross chain of Figure 5 with a different form of side chain, and Figure 12 is a sectional view on the line 12ª—12ª of Figure 4.

Similar reference numerals throughout the several views indicate the same parts.

The present invention comprises a non-skid chain of the variety particularly adapted for application to the rubber tires of automobile wheels, having side chains adapted to extend circumferentially of the wheel on either side of the tire with cross chains connecting the side chains at intervals over the tread of the tire to afford the desired tractive grip. As in the case of the form of cross chain construction described in my said copending application, the present cross chain comprises links individually detachable successively in order from one end of the chain, so that while any link may thus be readily removed when worn or broken, the links are nevertheless securely held together by an interlocking form of engagement so that they cannot be inadvertently disconnected in any position in which the chain may be placed. The present cross chain link, as shown in Figures 1 and 2, is preferably constructed of a length of heavy wire bent upon itself to provide a cross bar 16 at one end of the link from the ends of which extend opposite side portions 17 lying in a common plane and converging toward the opposite end of the link where they are brought together and turned rearwardly as at 19 and extended along the rear side of the link as at 20 into proximity with the rear side of the cross bar 16. As shown, the latter is preferably depressed rearwardly so that both it and the hook portion 20 are below the plane of the side portions 17 which are thus relatively raised into position to take the wear. The interval left between the hook end 20 and cross bar 16 is sufficient to permit passage therebetween of the hook of an adjacent link which however substantially closes the interval and prevents the passage therethrough and the detachment of a cross bar connected with the same link. It is thus apparent that the links are assembled successively and after assembly are individually detachable exclusively by detachment in successive order beginning with an end link connected by its hook portion, as for example the terminal link at the left hand end of the cross chain in Figure 1. The construction described provides a cross chain, the links of which may be readily detached individually but which successively lock one another together by a form of connection convenient to manipulate and requiring no close precision in dimension or workmanship with the attendant cost of the latter.

The above construction of cross link affords the additional advantage of readily and detachably receiving a wear body 21 in the form of a stud having a circular outer head of substantial size projecting beyond the wear sides of the link to take the major portion of the wear, the head having extending therefrom an intermediate or shank portion 22 of reduced diameter with a smaller head portion 23 at its inner end. It is apparent that this wear body may have its smaller head 23 passed between the converging sides 17 of a link adjacent the cross bar of the latter and then slid toward the hook end of the link to engage the reduced portion 22 in the bight between the link sides. With the wear body or stud thus associated with a link and the hoop portion of an adjacent link then engaged with the cross bar 16 of the first link, the wear body is effectively secured against detachment from the latter until the links themselves are disconnected. The wear bodies may, of course, have various forms, that described having the advantage of a simple one-piece construction adapted for manufacture economically from suitable material, such for example, as steel which may be hardened to increase its wear existing properties. The wear bodies are thus constructed and assembled are securely held in position but may be quickly and conveniently removed by detachment of the links in the manner described without the use of tools.

The side or circumferential chains with which the cross chains are connected may have any suitable character preferably comprising links having loop portions 23ª, as shown in Figures 1 and 5. The end of the cross chain at which detachment of its links may be begun is connected with the side chain by a detachable link which may also be employed for connecting the opposite end of the cross chain with the other side chain. One form of such end link is shown more particularly in Figures 4 and 12 as comprising substantially the form of a loop 24 cut away at one side as at 25 to provide opposing hook portions 26 for engagement respectively with a side chain and the cross bar 16 of the terminal link of the cross chain. To adapt the end link for connection with the opposite end of the cross chain which terminates in a hook 20, the hook portion 26 at one end of link 24 is cut away interiorly as at 27 to leave a cross bar 28 with which the hook end 20 of a cross chain link may be engaged. For the purpose of detachably securing end link 24 to the side and cross chains, a means is provided for closing the cut-away portion 25 between the hooks 26 comprising a clip 29 (Figure 12) pivotally supported as at 30 on a cross bar carried by an inset portion 31 at that side of the link opposite the cut-away portion. The clip extends from its pivot into the cut-away portion of the link as at 32 and is then turned at an angle so that its end 33, in closed position, may be engaged with the side of the link portion 31 opposite the pivot 30. Portion 31 at this side is formed with spaced shoulders 34 and the clip end 33 has a headed portion 35 as shown (Figure 4) for retaining engagement with shoulders 34. The clip is continued beyond its pivot as at 36 for engagement with portion 31 of the link in closed position of the latter to form a spring for removably holding the link in the closed position described. The clip may be provided with angular flanges 37 for stiffening its sides. The end of the clip may be manually disengaged and swung on its pivot to clear its hook ends for detachment from the side and cross chain to release the latter.

Another form of end link for connecting the cross and side chains is shown in Figures 6 and 7 as made up of relatively heavy wire in the general form of a loop as shown in Figure 6, having one side thereof cut away as at 38 to provide end hooks 39 substantially as in the first modification described. In this form however the opposite side of the loop has the two lengths of wire 40 which form it separated as shown in Figure 7 to produce a space or opening therebetween in which is slidably carried a clip 41 of resilient metal also in the form of a loop having overlapping ends 42. The sides of the clip are provided with corrugations 43, and it is apparent that it may be slid transversely of the link loop so that one end thereof either closes or clears the cut-away portion 38 of the opposite side of the link to control detachment of the hooks of the link from the cross and side chains. The corrugated portions 43 in which the spaced wires 40 yieldably engage serve to retain the clip in one or the other of its positions.

The general characteristics of the cross chain link described above may also be embodied in the form shown in Figures 8 and 9 which instead of being constructed of wire, may be manufactured as a forging or casting. In this variety the sides of the link are not converging, but may however be so shaped as shown in Figure 10, where it is desired to employ with this type of link the detachable wear body 21 described above.

Instead of the variety of side chain illustrated in Figures 1 and 5, a form may be employed comprising links 44, Figure 11, constructed of wire substantially in the manner of the cross chain links of Figure 5, except that the side portions 45 are parallel instead of converging to facilitate attachment therewith of the ends of the cross chain or the detachable end links for the latter.

The manipulation and use of the present chain has been explained in connection with the description of its construction, and it is apparent from the latter and the drawings that a simple, practical and economical non-skid chain is thereby provided affording the desirable feature of full detachability of the links of the cross chain without the use of tools and including also a detachable wear body for one or more of these links which may be renewed from time to time to preserve the chain itself. The design of both the cross chain link and wear resisting body is exceedingly simple so that it may be manufactured with a minimum number of operations and without working to precise measurements or finish. The cross chain links each present two sides lying in the same plane for taking wearing contact with the road, these sides being raised above the link connecting portions to preserve the latter, and this form of the link, particularly when provided with the wear body described affords a high degree of durability and economy and an efficient tractive grip with the ground.

I claim as my invention:

1. A chain composed of individually detachable links each comprising at one end a cross bar and at the other a hook portion turned rearwardly and extended along the rear side of the link into proximity with the hook portion of an adjacent link engaged with said cross bar to thereby prevent detachment of said links except by the detachment thereof successively beginning with a terminal one of said links.

2. A chain composed of individually detachable links each constructed of a length of heavy wire stock formed into a loop providing a cross bar at one end of the link with side portions extending longitudinally of the link to provide a hook portion at the other end thereof turned rearwardly and extended along the rear side of the link into proximity with the hook portion of an adjacent link engaged with said cross bar whereby said links are locked together and rendered individually detachable exclusively by the detachment thereof successively beginning with an end link connected by its hook portion.

3. In a non-skid chain, a cross chain composed of individually detachable links each comprising a raised wear resisting portion with a depressed cross bar at one end and at the other a hook portion turned rearwardly and extended along the rear side of the link into proximity with the hook portion of an adjacent link engaged with said cross bar whereby said links are locked together and rendered individually detachable exclusively by the detachment thereof successively beginning with an end link connected by its hook portion.

4. In a non-skid chain, a cross chain composed of individually detachable links each having a cross bar at one end with longitudinally converging side portions and a hook portion at the other end for detachable engagement with the cross bar of an adjacent link, and a wear body detachably engaged in the bight of said side portions and held against detachment from its link by the engagement with the latter of an adjacent link.

5. In a non-skid chain, a cross chain composed of individually detachable links each comprising at one end a cross bar and at the other a hook portion turned rearwardly and extended along the rear side of the link into proximity with the hook portion of an adjacent link engaged with said cross bar to thereby prevent detachment of said links except by the detachment thereof successively beginning with a terminal one of said links, and a wear body detachably carried by one of said links and held against detachment therefrom by the engagement therewith of an adjacent link.

6. In a non-skid chain, a cross chain composed of individually detachable links each having a cross bar at one end and longitudinally converging side portions and a hook portion at the other end for detachable engagement with the cross bar of an adjacent link, and a wear body having a reduced intermediate portion slidably and detachably engaged in the bight of said side portions and held against detachment from its link by the engagement with the latter of an adjacent link.

7. In a non-skid chain, a cross chain composed of individually detachable links each comprising substantially a loop having a depressed cross bar at one end with raised side portions converging longitudinally of the link to provide a hook portion at the other end of the latter for engagement with the cross bar of an adjacent link, and a wear body having a reduced intermediate portion slidably and detachably engaged between said side portions and held against detachment by the hook portion of an adjacent link engaged with said first cross bar.

8. The combination with a link for a non-skid chain having converging side portions lying in a common plane, of a one-piece wear body detachably carried between said side portions.

9. In a non-skid chain, a cross chain comprising a link having converging side portions and a one-piece wear body detachably engaged between said converging side portions and maintained in such engagement by contact with an adjacent link.

10. A link for a non-skid chain formed with a substantially V-shaped portion and a one-piece wear body having a portion adapted to be detachably received and retained in said V-shaped portion and to be held in the latter against detachment by the engaging portion of an adjoining link.

HARRY KLONICK.